United States Patent
Liberman et al.

(10) Patent No.: US 12,229,083 B2
(45) Date of Patent: Feb. 18, 2025

(54) LONG TERM AND SHORT TERM DATA MANAGEMENT OF A FILE BASED TIME SERIES DATABASE POPULATED WITH DATA COLLECTED BY AN ENERGY SENSOR FOR A POWER GENERATING DEVICE OR FROM ANOTHER DATA SOURCE

(71) Applicant: Inventus Holdings, LLC, Juno Beach, FL (US)

(72) Inventors: Amir Liberman, Loxahatchee, FL (US); Hooman Yousefizadeh, Port St Lucie, FL (US); Linga Murthy Manchala, Juno Beach, FL (US); Jeroen Leverman, Fort Pierce, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 170 days.

(21) Appl. No.: 17/711,021

(22) Filed: Mar. 31, 2022

(65) Prior Publication Data

US 2023/0315682 A1 Oct. 5, 2023

(51) Int. Cl.
*G06F 16/13* (2019.01)
*G06F 9/54* (2006.01)
*G06F 16/172* (2019.01)

(52) U.S. Cl.
CPC ............... *G06F 16/13* (2019.01); *G06F 9/54* (2013.01); *G06F 16/172* (2019.01)

(58) Field of Classification Search
CPC .......... G06F 16/13; G06F 9/54; G06F 16/172; G06F 16/24568; G06F 16/2477
See application file for complete search history.

(56) References Cited

U.S. PATENT DOCUMENTS

| | | | |
|---|---|---|---|
| 11,468,031 B1 * | 10/2022 | Hazel | G06F 16/2272 |
| 2004/0025057 A1 | 2/2004 | Cook | |
| 2008/0107045 A1 | 5/2008 | Berstis et al. | |
| 2018/0089324 A1 | 3/2018 | Pal et al. | |
| 2018/0332366 A1 | 11/2018 | Paduroiu | |
| 2020/0372071 A1 * | 11/2020 | Alayli | G06F 16/9035 |

(Continued)

OTHER PUBLICATIONS

International Search Report for corresponding PCT/US2023/065099 mailed Jun. 26, 2023.

(Continued)

*Primary Examiner* — Mark D Featherstone
*Assistant Examiner* — Samuel C Sharpless, III
(74) *Attorney, Agent, or Firm* — Tarolli, Sundheim, Covell & Tummino LLP

(57) ABSTRACT

An indexer retrieves a set of messages generated by a given data source of a plurality of data sources from a data storage. The indexer also processes the set of messages to generate processed data for the given data source and stores the processed data in a cache. The processed data includes a data file with data from the given data source and an index file identifying a location of the data file. The indexer determines when the processed data for the given generation source reaches a threshold size. The indexer also stores the data file of the processed data in the data storage and updates the index file for the processed data to identify the data storage as the location of the data file.

20 Claims, 6 Drawing Sheets

(56) References Cited

U.S. PATENT DOCUMENTS

2020/0380157 A1    12/2020  Raab
2021/0406317 A1*   12/2021  Beedgen ................... G06F 7/00

OTHER PUBLICATIONS

Pelkonen, et al.: "Gorilla: A Fast, Scalable, In-Memory Time Series Database"; Proceedings of the VLDB Endowment, vol. 8, No. 12, Copyright 2015 VLDB Endowment 21508097/15/08; found on the internet Jun. 28, 2022 at: chrome-extension://efaidnbmnn-nibpcajpcglclefindmkaj/https://www.vldb.org/pvldb/vol8/p1816-teller.pdf.

* cited by examiner

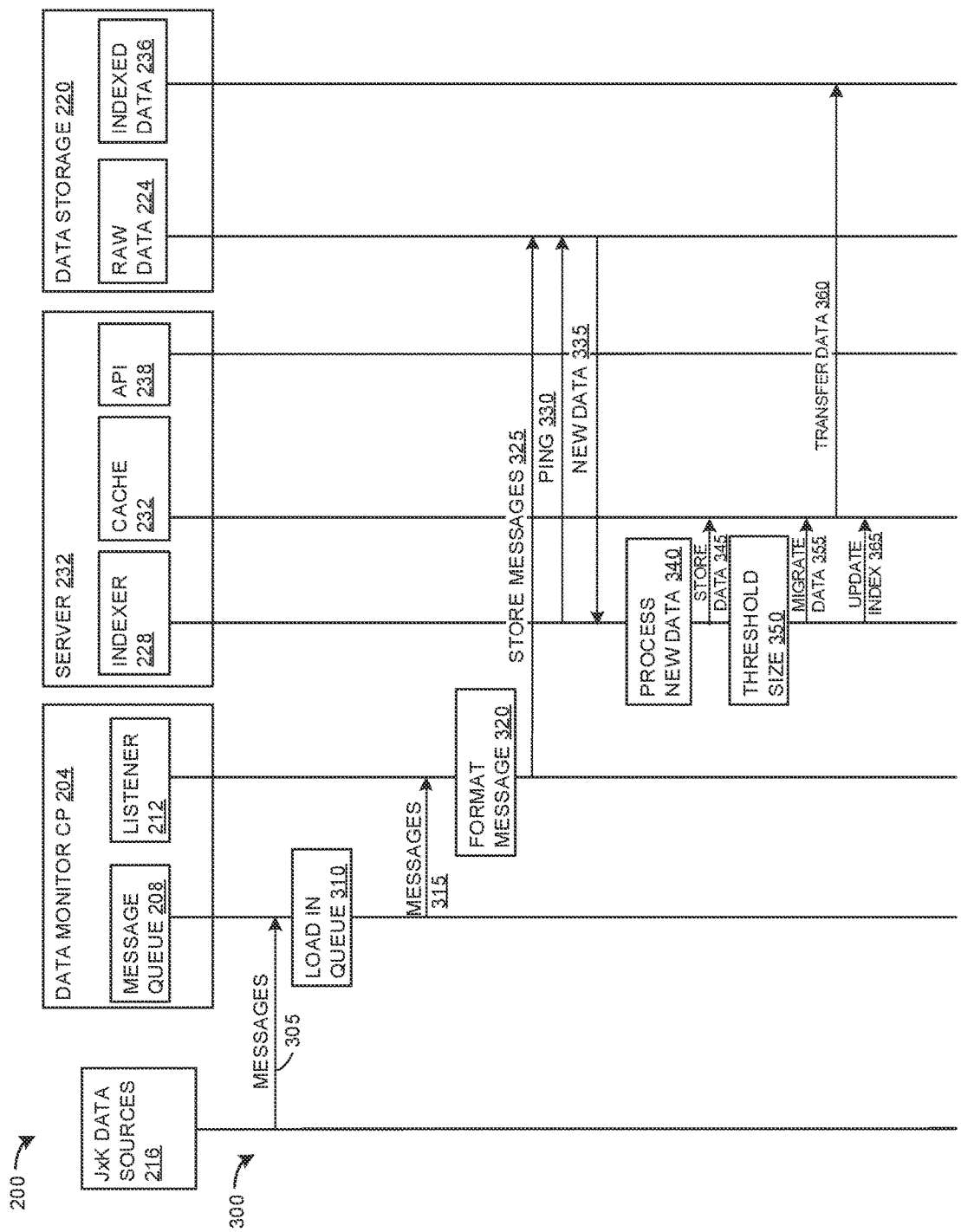

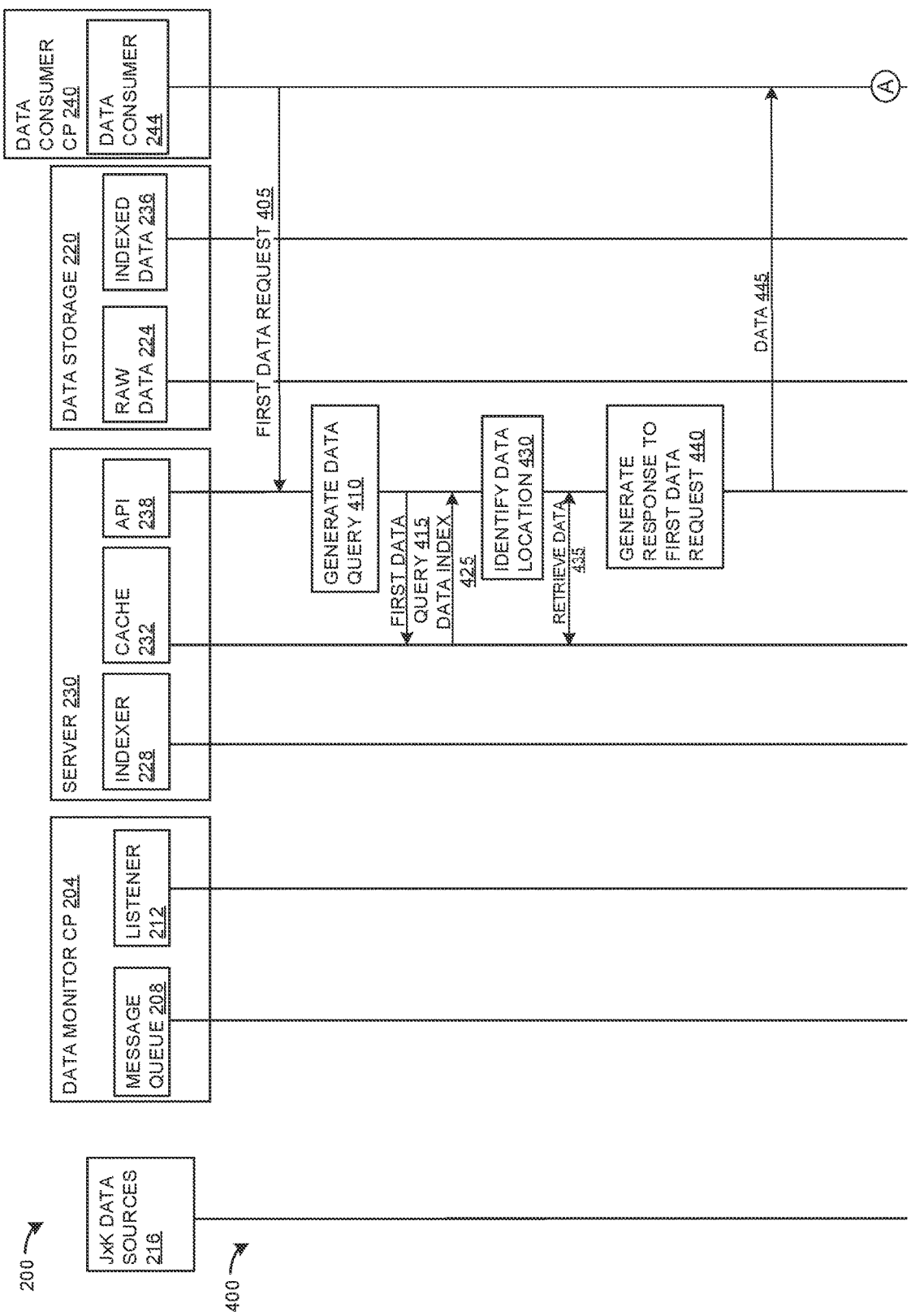

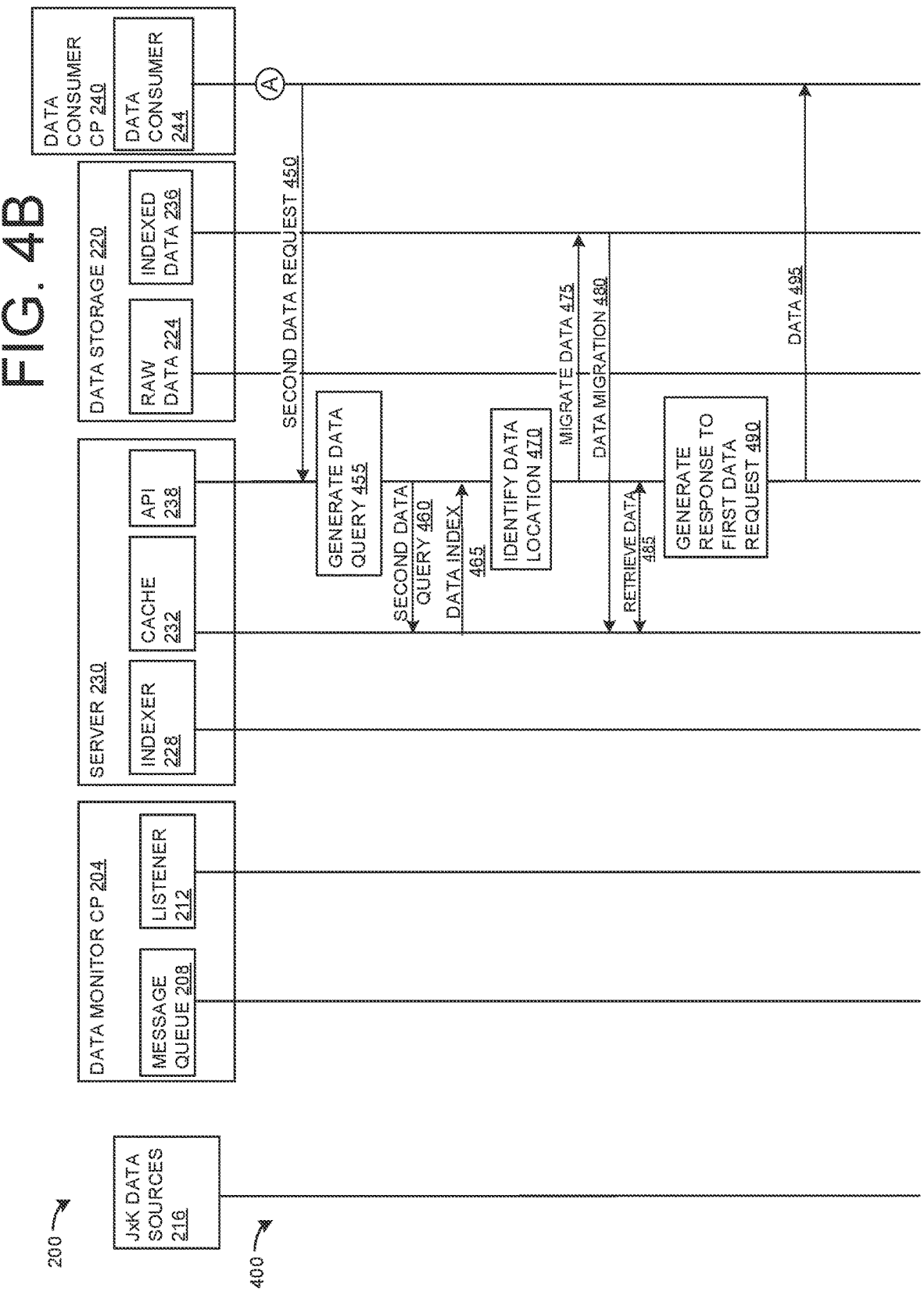

LONG TERM AND SHORT TERM DATA MANAGEMENT OF A FILE BASED TIME SERIES DATABASE POPULATED WITH DATA COLLECTED BY AN ENERGY SENSOR FOR A POWER GENERATING DEVICE OR FROM ANOTHER DATA SOURCE

TECHNICAL FIELD

This disclosure relates to data management. More particularly, this disclosure relates to a system that manages the short term and long term storage and retrieval of a file based time series database. The time series database can be populated with data collected by an energy sensor of a power generator or from another data source.

BACKGROUND

A time series database (TSDB) is a software system that is optimized for storing and serving time series through associated pairs of time(s) and value(s). In some fields, time series may be referred to as profiles, curves, traces or trends. Several early time series databases are associated with industrial applications which could efficiently store measured values from sensory equipment (also referred to as data historians), but now are used in support of a much wider range of applications. Although it is possible to store time-series data in many different database types, the design of these systems with time as a key index is distinctly different from relational databases which reduce discrete relationships through referential models.

Time series datasets are relatively large and uniform compared to other datasets, usually being composed of a timestamp and associated data. Time series datasets can also have fewer relationships between data entries in different tables and don't require indefinite storage of entries. The unique properties of time series datasets mean that time series databases can provide significant improvements in storage space and performance over general purpose databases. Time series databases can also be configured to regularly delete old data, unlike regular databases which are designed to store data indefinitely. Special database indices can also provide boosts in query performance.

SUMMARY

One example relates to a non-transitory machine-readable medium having machine-executable instructions. The machine-readable instructions include an indexer that retrieves a set of messages generated by a given data source of a plurality of data sources from a data storage. The indexer also processes the set of messages to generate processed data for the given data source and stores, by the indexer, the processed data in a cache. The processed data includes a data file with data from the given data source and an index file identifying a location of the data file. The indexer determines when the processed data for the given generation source reaches a threshold size. The indexer also stores the data file of the processed data in the data storage and updates the index file for the processed data to identify the data storage as the location of the data file.

Another example relates to a system for managing data. The system includes a listener operating on one or more computing platforms that collects messages from a message queue filled with messages generated by a plurality of data sources and concatenates messages from a given data source of the plurality of data sources to form a set of messages and stores the set of messages in a data storage. The system also includes an indexer on the one or more computing platforms that retrieves the set of messages from the data storage and processes the set of messages to generate processed data. The indexer also stores the processed data in a cache, wherein the processed data includes a data file with data from a given data source and an index file identifying a location of the data file and determines when the data file of the processed data for the given generation source reaches a threshold size. The indexer further stores the data file in the data storage in response to the determining and updates the index file for the processed data to identify the data storage as the location of the data file. The system further includes an application programming interface (API) operating on the one or more computing platforms that interfaces with external computing platforms to handle requests for data generated by the plurality of generation sources.

Yet another example relates to a method for managing data, the method includes collecting, by a listener operating on one or more computing devices, messages from a message queue filled with messages generated by a plurality of generation sources and concatenating, by the listener, messages associated with a given data source of the plurality of data sources to form a set of messages associated with the given data source. The method also includes retrieving, by an indexer operating on the one or more computing devices, the set of messages associated with the given data source and processing the set of messages to provide processed data for the given data source. The method further includes storing, by the indexer, the processed data in a cache, wherein the processed data includes a data file with data from the given data source and an index file identifying a location of the data file and determining, by the indexer, when the processed data for the given generation source reaches a threshold size. The method still further includes archiving the data file of the processed data in a data storage and updating the index file for the processed data to identify the data storage as the location of the data file.

BRIEF DESCRIPTION OF THE DRAWINGS

FIG. 3 illustrates a timing diagram depicting an example of a timing of operations by a system for executing a method for automated data storage and migration.

FIGS. 4A-4B illustrates a timing diagram depicting an example of a timing of operations by the system of FIG. 3 for executing a method for automated data retrieval.

DETAILED DESCRIPTION

This disclosure relates to a filed based time series database that efficiently stores data and retrieves data. In particular, the filed based time series database stores data, such as sensor data, provided by a given data source (e.g., an Internet of Things (IoT) sensor) of a plurality of data sources received over a given interval of time in a given file. Additionally, an indexer processes the file to generate a data file, an index file, a metadata file and a lock file stored in a cache (e.g., cache memory). After the data file reaches a predetermined size, the indexer moves (archives) the data file from the cache to indexed data on a data storage. Accordingly, an application programming interface (API) can query the index file to locate and retrieve a data file (or multiple data files) based on data stored in the metadata file. Because the data from the data sources is stored in files over time periods and the files generated by processing are stored based on size, the API can efficiently query the file based time series database.

Moreover, the indexer performs linear and non-linear compression on the data files during processing. Particularly, the indexer processes data collected over a given time interval. Accordingly, data provided from a given data source over the given time interval can stay constant over a time interval (window of time). For example, a position sensor can indicate no change in position occurs over the given time interval. Thus, position data from the sensor becomes redundant for the given time interval. Accordingly, non-linear compression can remove the redundant data to save valuable memory space in both the data file and the index file. Additionally, data provided by a given device source over the given time interval can change at a linear rate for the given time interval or for a subset of the given time interval. For example, a tachometer may sense rotations per minute (RPM) of a wind turbine slowing linearly over a subset of the given time interval due to the absence of wind. Accordingly, linear compression can remove redundant tachometer data over the subset of the given time interval in lieu of data that characterizes the linearity. Thus, non-linear and linear compression can save memory space in both the data file and the index file.

Figure 1:
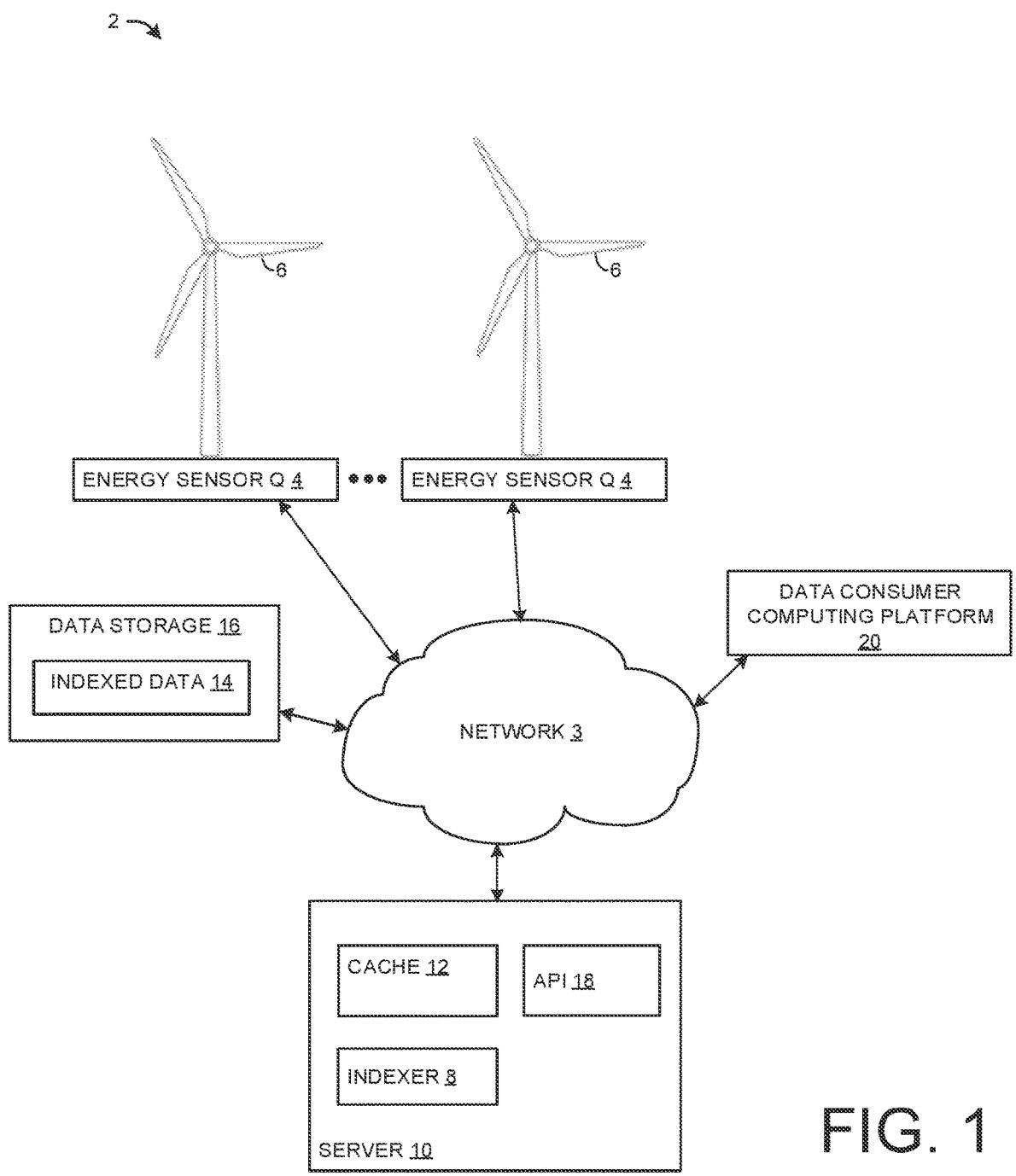
FIG. 1 illustrates an example of a system for managing a file based time series database.

FIG. 1 illustrates o a filed based time series database system 2 that efficiently stores data and retrieves data. The time series database system 2 includes nodes that communicate over a network 3 (e.g., the Internet or a utility network). The filed based time series database 2 stores data, such as sensor data, provided by an energy sensor 4 mounted on a wind turbine 6. In FIG. 1, there are Q number of energy sensors 4 mounting on a corresponding one of Q number of wind turbines 6, wherein Q is an integer greater than or equal to one. However, in other examples, there is more than one energy sensor 4 mounted on a corresponding wind turbine 6. Each energy sensor 4 represents a data measuring device, such as a rotations per minute (RPM) sensor (e.g., a tachometer), a position sensor, a power generation sensor or other sensor for measuring an operational performance of the corresponding wind turbine 6.

Each energy sensor 4 provides data over a given interval of time in a given file through the network 3. Additionally, an indexer 8 operating on a server 10 processes the file to generate a data file, an index file, a metadata file and a lock file stored in a cache 12 (e.g., cache memory) of the server. The cache 12 is implemented with volatile memory for the server 10. After the data file reaches a predetermined size (due to collection of data over time), the indexer 8 moves (archives) the data file from the cache to indexed data 14 on a data storage 16 that is implemented as non-volatile memory (e.g., a hard disk drive). Accordingly, an application programming interface (API) 18 can query the index file of the cache 12 to locate and retrieve a data file (or multiple data files) based on data stored in the metadata file. Because the data from the Q number of energy sensors 4 is stored in files over time periods and the files generated by processing are stored based on size, the API 18 can efficiently query the file based time series database system 2.

Moreover, the indexer 8 execute linear and non-linear compression on the data files of the cache 12 during processing. Particularly, the indexer 12 processes data collected over a given time interval. Accordingly, data provided from a given energy sensor 4 over the given time interval can stay constant over a time interval (window of time). For example, a position sensor can indicate no change in position occurs over the given time interval. Thus, position data from the energy sensor 4 becomes redundant for the given time interval. Accordingly, non-linear compression can remove the redundant data to save valuable memory space in both the data file and the index file of the cache 12. Additionally, data provided by another energy sensor 4 over the given time interval can change at a linear rate for the given time interval or for a subset of the given time interval. For example, a tachometer may sense RPMs of a wind turbine 6 slowing linearly over a subset of the given time interval due to the absence of wind. Accordingly, linear compression can remove redundant tachometer data over the subset of the given time interval in lieu of data that characterizes the linearity. Thus, non-linear and linear compression can save memory space in both the data file and the index file.

By employing the time series database system 2, data from the energy sensors 4 (or some subset thereof) can be initially stored in the cache 12 and archived in the indexed data 14 of the data storage 16 over time. The data consumer computing platform 18 can include a data consumer such as application software (e.g., an app) executing thereon that employs the data to generate outputs and/or actuate systems. In one example, it is presumed that the data consumer represents a supervisory control and data acquisition (SCADA) system that monitors the operations of wind turbines 6. Periodically and/or asynchronously, the consuming computing platform 20 requests data managed by the server 10 and generates a request and provides the request for the data to the API 18 of the server 10.

In response to receiving a request, the API 10 can generate a query for the data file based on tags stored in a metadata file and return data stored in the data file of the cache 12. If the data requested is in the cache 12, the API 18 can query the indexer 8 to return data stored in the index data to the data consumer 20. Because the API 18 queries are based on metadata, the API 18 can identify and search data files that are pertinent to the request.

In examples where the requested data is stored in the indexed data 14 in the data storage 16, the API 18 migrates the requested data from the indexed data 14 to the cache 12, and retrieves the requested data from the cache 12. In either situation, the API 18 provides the requested data to the data consumer 20 to fulfil the original request for the data. That is, the file structure of the file based time series database system 2 enables the API 18 to identify and search a given file rather than searching through all data collected to reduce an amount of time needed to handle the request for data.

Furthermore, in examples where the requested data is migrated to the cache 12, the requested data remains in the cache 12 for a time threshold (e.g., 4 hours or another amount of time). In this manner, the API 18 can retrieve the requested data from the cache 12 prior to expiration of the time threshold, without migrating the requested data to the cache 12. Accordingly, subsequent requests for the same requested data is handled more rapidly. As noted, the cache 12 is implemented with volatile memory and the data storage 16 is implemented with non-volatile memory that had a longer access and retrieval time. Thus, by temporarily migrating selected data, namely, the requested data to the cache 12, overall performance of the time series database system 2 is improved.

Figure 2:
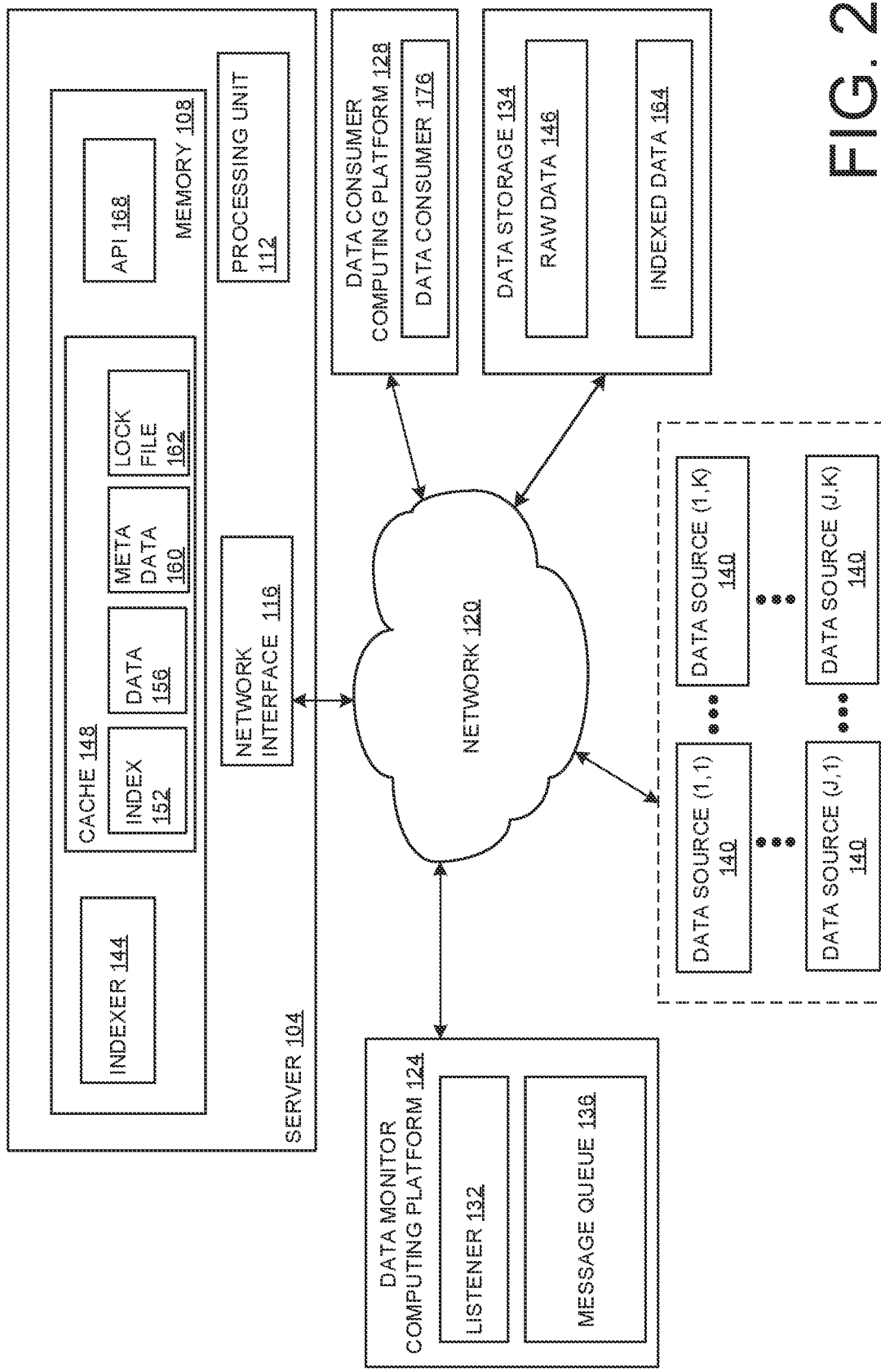
FIG. 2 illustrates another example of a system for managing a file based time series database.

FIG. 2 illustrates an example of a system 100 for managing a file based time series database. The system 100 can include a server 104 (e.g., a computing platform) that can include a memory 108 for storing machine-executable instructions and data and a processing unit 112 for accessing the memory 108 and executing the machine-executable instructions. The memory 108 represents a non-transitory machine-readable medium, such as random access memory (RAM), a solid state drive, a hard disk drive or a combination thereof. The processing unit 112 can be implemented as one or more processor cores. The server 104 can include a network interface 116 (e.g., a network interface card) configured to communicate with other computing platforms via a network 120, such as a public network (e.g., the Internet), a private network (e.g., a local area network (LAN)) or a combination thereof (e.g., a virtual private network).

The server 104 could be implemented in a computing cloud. In such a situation, features of the server 104, such as the processing unit 112, the network interface 116, and the memory 108 could be representative of a single instance of hardware or multiple instances of hardware with applications executing across the multiple of instances (i.e., distributed) of hardware (e.g., computers, routers, memory, processors, or a combination thereof). Alternatively, the server 104 could be implemented on a single dedicated server or workstation.

Other computing platforms (e.g., computing devices) of the system 100 also communicate on the network 120. These other computing devices include a data monitor computing platform 124 and a data consumer computing platform 128. For purposes of simplification of explanation, details of the data monitor computing platform 124 and the data consumer computing platform 128 are omitted. However, it is understood that the data monitor computing platform 124 can be implemented in a similar manner as the server 104. In fact, in some examples, the server 104 and the data monitor computing platform 124 and/or the data consumer computing platform 128 are operating on the same computing device. Unless otherwise indicated, it is presumed that the modules of the data monitor computing platform 124 and the data consumer computing platform 128 are stored in a non-transitory memory that is access by a processing unit (e.g., one or more processing cores).

The data monitor computing platform 124 executes a listener 132 that manages a message queue 136. Although the listener 132 and the message queue 136 are illustrated as operating on the same computing platform (e.g., the data monitor computing platform 124), in other examples, the listener 132 and the message queue 136 are executing on separate computing platforms.

The message queue 136 is filled with messages from J×K number of data sources 140, where J and K are integers greater than or equal to two (2). Each of the data sources 140 represent devices, such as sensors that monitor the operations of a corresponding one of J number of external systems. Thus, each of the data sources 140 includes a two-dimensional index number (i, j) that uniquely identifies the data sources 140 and the corresponding external system. Stated differently, a subset of the data sources 140 (K number) monitors operations of a particular external system (one of the J number of external systems). Accordingly, each of the J number of external systems has K number of data sources 140 (where K can be the same or different for each of the J number of external systems). For instance, in a given example (hereinafter, "the given example") suppose that the external systems represent wind turbines. In the given example, there are J number of wind turbines in the windfarm, and each of the J number of wind turbines includes K number of data sources 140. For instance, a first data source 140 of the first wind turbine would be referenced as data source (1, 1). Continuing with the given example, the data source (1, 1) could be an Internet of Things (IoT) sensor that monitors the rotations per minute (RPM) of the first wind turbine. Similarly, a second data source 140 on the first wind turbine in the given example could be referenced as data source (1, 2). In such as situation, the second data source (1, 2) of the first wind turbine could measure power generation (e.g., in Watt(s)) output by the first wind turbine. Accordingly, each of the K number of data sources for the J number of external systems (wind turbines in the given example) can be uniquely referenced.

In various examples, the J×K number of data sources 140 can represent nearly any type of data source that provides time series data. For instance, in the given example, the J×K number of data sources 140 could additionally include energy sensors for measuring output power, position, wind speed and/or direction, air temperature, relative humidity, etc. In other situations, such as a situation where the J number of external sources represent a battery rack, the K number of data sources 140 can include cell temperature sensors, voltmeters, ammeters, power output meters, etc.

Furthermore, the system 100 is employable in situations outside of power generation and/or power supplies. For instance, the J number of external systems can represent point of sale (PoS) systems. In such a situation, the K number of data sources 140 for each such PoS system can represent transaction monitors that record individual transactions (e.g. purchases and returns) at the corresponding PoS system. Still further, the J number of external systems can represent aircraft. In this situation, the K number of data sources 140 can represent sensors for the corresponding aircraft, such as airspeed sensors, fuel usage sensors, altimeters, heading monitors, etc. In still other examples, the J number of external systems can represent electric vehicles. In these examples, the K number of data sources 140 can represent sensors for the corresponding electric vehicle, such as a speedometer, a voltmeter, etc.

The examples provided here are not meant to be exhaustive. Nearly any external system that has sensors for measuring time series data is employable in the system 100. For instance, the system 100 is alternatively employable in areas such as mining and/or manufacturing where sensors monitor operations. In each of these examples, there can be intervals of time where the data measured by each such data source 140 varies considerably, and intervals of time where the data remains relatively constant. For instance, in the example where the J number of external systems represent PoS systems, during hours that a retail outlet is open, there will typically be wide fluctuations in the number of transactions. Conversely, during hours that the retail outlet is closed, the number of transactions may reduce to about 0 and remain at that level until the retail outlet re-opens.

Periodically and/or asynchronously, each of the J×K number of data sources 140 (or some subset thereof) generates a message that characterizes a current state of the corresponding external system. Thus, each of the J×K number of data sources 140 generate time series data to characterize a changing state of the corresponding external system. These messages are stored in the message queue 136. The message queue 136 can be implemented, for example, as a buffer (e.g., a data structure), such as a first in first out buffer, a first in last out buffer, a random access buffer, etc.

The listener 132 accesses the message queue 136 and concatenates messages from a given data source 140 until the messages from the given data source 140 meet a threshold size (e.g., 64 megabytes (MB), 128 MB, 256 MB, etc.)

to form a set of messages for the given data source as a block of data with a predetermined size (e.g., the threshold size). For example, the listener 132 retrieves messages from the message queue 136 generated by the data source (1, K) 140 and concatenates such messages to form a time series for the data source (1, K) 140 until the set of messages meets the threshold. Accordingly, the set of messages for the data source (1, K) 140 characterizes a state of the external system (e.g., the external system 1) over an interval of time (e.g., a time series of data). Over time, the listener 132 generates a set of messages for each of the J×K number of data sources 140 that meet the threshold size, or some subset thereof.

In response to a given set of messages meeting the threshold size, the listener 132 transfers the given set of messages to the data storage 134 as raw data 146. Periodically (e.g., once per hour) and/or asynchronously, an indexer 144 stored in the memory 108 of the server 104 checks the data storage 134 for newly added raw data 146 (e.g., a newly added set of messages). Thus, over time, the indexer 144 retrieves a set of messages of each of the J×K number of data sources 140, or some subset thereof.

In response to retrieval of each set of messages (generated by the data sources 140), the indexer 144 adds metadata, such as tags and/or location information to each set of messages to uniquely identify the set of data. For instance, in the given example where a given set of messages represents RPMs for a particular wind turbine over an interval of time, the metadata can uniquely identify the particular wind turbine, the location of the wind turbine and the RPMs over an interval of time.

Additionally, the indexer 144 can parse each set of messages (or some subset thereof) to identify exceptions, such as corrupted and/or missing data within a given set of messages. In some examples, in response to detecting corruption of data and/or a 'disconnect' (e.g., missing data) the indexer 144 marks the corrupted data and/or missing data and subsequently unmarks the marked data in response to the data in the set of messages stabilizing. The indexer 144 executes this operation so that later analysis of the data of the set of messages will indicate that corrupted data and/or missing data (e.g., gaps of data) were not caused by improper indexing by the indexer 144 but rather due to bad input. In other examples, to handle the exceptions, the indexer 144 can correct corrupted data. In still other examples, to handle the exceptions, the indexer 144 can drop/ignore messages with corrupted and/or missing data.

Further, the indexer 144 can compress each set of messages using a compression algorithm, such as a linear compression algorithm and/or a non-linear compression algorithm. As noted, each set of data represents a time series of data characterizing a state of an external system over an interval of time. In examples where the data remains constant for sub-intervals of the corresponding interval of time, the indexer 144 can compress the time series of data to reduce a size needed to store a corresponding set of messages. Continuing with the given example, suppose that a given set of messages for a particular wind turbine for a given interval of time (e.g., 2 hours) indicates that during the two hours, for the first 0.25 hours, a first sub-interval of time, the RPMs on the particular wind turbine remained constant (e.g., 10 RPMs), and then for the next 0.5 hours, a second sub-interval of time, the RPMs for the particular wind turbine abruptly increased to 15 RPMs and remained constant. Additionally, suppose that for a third sub-interval of time (e.g., next 30 minutes), the particular wind turbine linearly reduced its RMS to 8 RPMs over an interval of about 30 minutes. In this case, the indexer 144 can use a nonlinear compression algorithm on the messages within the given set of messages representing the first sub-interval of time (e.g., the first 0.25 hours) to reduce redundancy in the set of messages such that a single (or several) messages indicates that the particular wind turbine had 10 RPMs over the first sub interval of time. Further, sub-intervals of time where the time series changes are not compressed. Thus, in the given example, the messages within the given set of messages representing the second sub-interval of time (0.5 hours after the first sub-interval of time) would typically not be compressed due to the abrupt change in RPMs. Stated differently, in situations where the set of messages representing the time series data indicates that the state of the corresponding external system is transient, the indexer 144 keeps the messages characterizing the transient state. Further still, in the third sub-interval of time, where the RPMs of the wind turbine decrease at a linear rate, the indexer 144 can employ linear compression to reduce the number of messages representing the third sub-interval of time, including the linear reduction in the RPMs of the wind turbine. In this manner, the time series data represented by each given set of messages can be uncompressed without losing resolution of the data. Accordingly, in various examples, the indexer 144 can reduce a number of data values in the time series data by at least 50% if it is determined that the data values of the time series data remain constant over a sub-interval of time of for a particular interval of time.

In response to processing each set of messages to add the metadata, handle exceptions and/or compress each set of messages, the indexer 144 provides processed sets of messages. Each processed set of messages can be partitioned (sectioned) as files and stored in a cache 148 of the memory 108. The partitions for each set of messages can include an index file 152, a data file 156, a metadata file 160 and a lock file 162. The data file 156 stores the data extracted from the sets of messages for a particular data source 140 in a fixed sized format (e.g., a frame). The metadata file 160 stores the metadata (e.g., tag configuration and statistics about the external system identity and location) of the time series data represented by the data file 156 or a given set of messages. Still further, the index file 152 includes a pointer that identifies a present location of the data file 156 (which can change over time). The lock file 162 is employed to signal a state of the tag between processes to prevent write corruption and/or unreliable reads.

Over time, additional sets of data for a given data source 140 are processed by the indexer 144. In response to the data file 156 reaching a record threshold (e.g., 96,000 records), the indexer 144 archives the data file 156 in a file stored as indexed data 164 of the data storage 134, and updates the index file 152 to identify the location of the data file 156 (migrated to the indexed data 164). Additionally, the indexer 144 creates a new instance of the data file 156 and subsequently begins to process the next sets of messages in a similar manner. Accordingly, over time, an array of files for each data source 140 are stored in the indexed data 164, wherein each such file can represent an interval of time. That is, the array of files stored in the indexed data is time series data.

In some examples, the cache 148 is implemented as volatile memory (e.g., RAM), and the indexed data 164 is implemented as non-volatile memory (e.g., a hard disk drive, a solid state drive and/or flash memory). In such examples, the indexed data 164 has a longer access time than the data file 156 of the cache 148. A combination of the cache 148 and the indexed data 164 stores time series data from each of the J×K number of data sources 140 (or some subset thereof) in a file. Thus, the cache 148 and the indexed data 164, in combination, form a file based time series database that can be accessed for retrieval of data in a manner discussed herein.

The memory 108 of the server 104 includes an application programming interface (API) 168 that can handle requests for retrieval of data from external computing platforms, such as a data consumer computing platform 128. In some examples, the data consumer computing platform 128 can be implemented, for example, as an end-user device (e.g., a desktop computer, a laptop computer, a smart phone or a tablet computer). In other examples, the data consumer computing platform 128 can be implemented as a server, such as a web server and/or a server for a utility system (e.g., in the given example).

The data consumer computing platform 128 can include a data consumer 176 executing thereon. The data consumer 176 represents application software (e.g., an app) that employs the data to generate outputs and/or actuate systems. In the given example, it is presumed that the data consumer 176 represents a supervisory control and data acquisition (SCADA) system that monitors the operations of wind turbines on the wind farm for J number of wind turbines that each have K number of data sources 140 (e.g., sensors).

Periodically and/or asynchronously, the data consumer 176 requests data managed by the server 104. More particularly, in such situations, the data consumer 176 generates a request and provides the request for the data to the API 168 of the server 104. The request can include, for example, data identifying a particular external system, as well as the time/date and the type of data requested.

In response to receiving a request, the API 168 can generate a query for the data file 156 based on tags stored in the metadata file 160 and return data stored in the data file of the cache 148. If the data requested is not in the cache 148, the API 168 can query the index file 152 to return data stored in the index file 152. Because the API 168 queries are based on metadata, the API 168 can identify and search data files that are pertinent to the request.

In examples where the requested data is stored in the indexed data 164, the API 168 migrates the requested data from the indexed data 164 to the cache 148, and retrieves the requested data from the cache 148. In either situation, the API 168 provides the requested data to the data consumer 176 to fulfil the original request for the data. That is, the file structure of the file based time series database enables the API 168 to identify and search a given file rather than searching through all data collected to reduce an amount of time needed to handle the request for data.

Furthermore, in examples where the requested data is migrated to the cache 148, the requested data remains in the cache 148 for a time threshold (e.g., 4 hours or another amount of time). In this manner, the API 168 can retrieve the requested data from the cache 148 prior to expiration of the time threshold, without migrating the requested data to the cache 148. Accordingly, subsequent requests for the same requested data is handled more rapidly. As noted, the cache 148 is implemented with volatile memory and the data storage 134 is implemented with non-volatile memory that had a longer access and retrieval time. Thus, by temporarily migrating selected data, namely, the requested data to the cache 148, overall performance of the system 100 is improved.

FIG. 3 illustrates a timing diagram depicting an example of a timing of operations by a system 200 for executing a method 300 for automated data storage and migration in a file based time series database. The system 200 can be employed to implement the system 100 of FIG. 2 or the time series database system 2 of FIG. 1. Thus, the system 200 can include a data monitor computing platform 204 (e.g., a cloud server and/or a utility server) with application software for a message queue 208 and a listener 212.

The message queue is filled with messages from J×K number of data sources 216, wherein J and K are both integers greater than one, such as the J×K number data sources 140 of FIG. 2. More particularly, at 305, the J×K number of data sources 216 provide messages to the message queue 208, and at 310, these messages are loaded in the message queue 208.

At 315, the listener 212 collects messages from the message queue 208. At 320, the listener 212 concatenates and formats the collected messages to form a set of messages for each instance of the J×K number of data sources 216. In the example illustrated in FIG. 2, there would be J×K set of messages. Each set of messages are concatenated and formatted until the respective messages reach a threshold size (e.g., 64 MB, 128 MB, 256 MB, etc.). At 325, in response to a given set of messages reaching the threshold size, the listener 212 stores the given set of messages in a data storage 220 as raw data 224 as a block of data with a predetermined size (e.g., the threshold size). The operation at 305-325 can be repeated for each of the J×K number of data sources 216 (or some subset thereof).

At 330, an indexer 228 operating on a server 230 (e.g., the server 104 of FIG. 2) pings the data storage 220 for newly added instances of raw data 224 (e.g., a newly added set of messages for a particular data source 216). The ping at 330 is executed periodically (e.g., every hour) and/or asynchronously (e.g., in response to an event). At 335, the newly added data (e.g., a new set of records) in the raw data 224 is returned to the indexer 228.

At 340, the returned set of records (new data) is processed by the indexer 228. The processing of the data at 340 includes handling exceptions (e.g., marking/unmarking, correcting and/or removing missing and/or corrupted data), compressing the sets of messages and tagging the sets of messages with metadata. At 345, the indexer 228 stores the processed data in a cache 232. The processed data is stored as sectioned files, namely, an index file (e.g., the index file 152 of FIG. 2), a data file (e.g., the data file 156 of FIG. 2), a metadata file (e.g., the metadata file 160 of FIG. 2) and a lock file (e.g., the lock file 162 of FIG. 2).

The operations of 305 to 345 are repeated for each of the J×K number of data sources 216, such that the cache 232 is loaded with additional data for each data source 216 over time. In each such execution, the file set associated with a given data source 216 is augmented with new data records. At 350, it is presumed that the given data source reaches a threshold number of records (e.g., 96,000). Thus, at 355 (in response to the given data source 216 reaching the threshold number of records in the cache 232, the indexer 228 initiates a migration of the data file stored in the cache to archive the data for the given data source 216. In response, at 360, the cache 360 transfers the data file for the given data source 216 to indexed data 236 of the data storage 220. Additionally, at 365, the indexer 228 updates a status of the index file for the given data source 216 to identify the indexed data 236 as the location of the migrated data.

As the method of 300 is repeated, over time, a plurality of data files are migrated for the given data source 216 to the indexer 228. In this manner, each data file stored in the 236 represents time series data for the given data source 216 for an interval of time. Accordingly, over time, each of the J×K number of data sources 216 (or some subset thereof) has an array of files stored in the indexed data 236. As is explained herein, an API 238 of the server 230 is employable to handle requests for data stored in the cache 232 or the indexed data 236.

FIGS. 4A-4B illustrates a timing diagram depicting an example of a timing of operations by the system 200 of FIG. 3 for executing a method 400 for automated data retrieval. For the method 400, it is presumed that the method 400 of FIG. 3 has executed a sufficient number of times that there is an array of files stored for each of the J×K number of data sources 216 in the indexed data 236. Additionally, the system 200 also includes an external computing platform, namely a data consumer computing platform 240, such as the data consumer computing platform 128 of FIG. 2. Thus, the data consumer computing platform 240 includes a data consumer 244 (application software) executing thereon.

At 405, The data consumer 244 provides a first data request (e.g., a first request for data) to the API 238 of the server 230. The first data request can identify, for example, a particular time interval and/or a particular data source 216 for which data is requested. In response to the request, at 410, the API 238 generates a first data query for the first data request. The API 238 can generate the query for the first data request based on tags stored in the metadata file of the cache 232. At 415, the API 238 employs the first data query on the index file of the cache 232 associated with the first data query. At 425, a data index for the requested data is provided to the API 238. At 430, the API 238 examines the data index to identify a location of the data requested in the first data request. It is presumed that the first data is located in a data file (e.g., the data file 156 of FIG. 2) stored in the cache 232. At 435, the API 238 retrieves the data file from the cache 232. At 440, the API 238 generates a response to the first data request. At 445, the API 238 provides the requested data in the first data request to the data consumer 244 to complete handling of the first data request.

The method 400 proceeds to node 'A', and the method 400 continues in FIG. 4B. At 450, the data consumer 244 provides a second data request (e.g., a second request for data) to the API 238 of the server 230. The second data request can identify, for example, a second particular time interval and/or a second (or the same) particular data source 216 for which data is requested. In response to the request, at 455, the API 238 generates a second data query based on metadata tags in the metadata file of the cache 232 for the second data request. At 460, the API 238 employs the second data query on the index file of the cache 232 associated with the second data query. At 465, a data index (e.g., a pointer) is returned to the API 238. At 470, the API 238 examines the data index to identify a location of the data requested in the first data request. It is presumed that the data requested in the second data request is located in a data file stored in the indexed data 236. At 475, the API 238 instructs the indexed data 236 to migrate data to the cache 232. At 480, the indexed data 236 is migrated to the cache 232 and the corresponding index file is updated to indicate that the cache 232 as the location of the migrated data. At 485, the API 238 retrieves the data file from the cache 232. At 490, the API 238 generates a response to the second data request. At 495, the API 238 provides the requested data in the first data request to the data consumer 244 to complete handling of the second data request. After a window of time (e.g., 4 hours), the migrated data can be re-archived in the indexed data 236. During the window of time, subsequent requests for the migrated data can be handled by the cache 232.

As illustrated in FIGS. 3A and 3B, the API 238 is configured to execute operations such that from the perspective of the data consumer 244 requests for data are handled in the same way. Stated differently, the API 238 unburdens the data consumer 244 from having to be provided an indication of a current location of data. Instead, the data consumer 244 can simply request needed data, and the API 238 identifies a location of the data (which could be the cache 232 or the indexed data 236), retrieves the data and provides the requested data to the data consumer 244. In this manner, older data with slower access (e.g., indexed data 236, stored in non-volatile memory) can be accessed in the same way as newer data (e.g., data files still in the cache 232, stored in volatile memory). Additionally, in examples where requested data is initially in the indexed data 236, this requested data is temporarily migrated to the cache 232 for faster subsequent access during a window of time. Thus, during the window of time, a subsequent data request for the requested data by the second data request can be handled in a manner similar to the first data request 405 of FIG. 4A. That is, such a subsequent data request can be handled with access to the cache 232 and without accessing the data storage 220.

Figure 5:
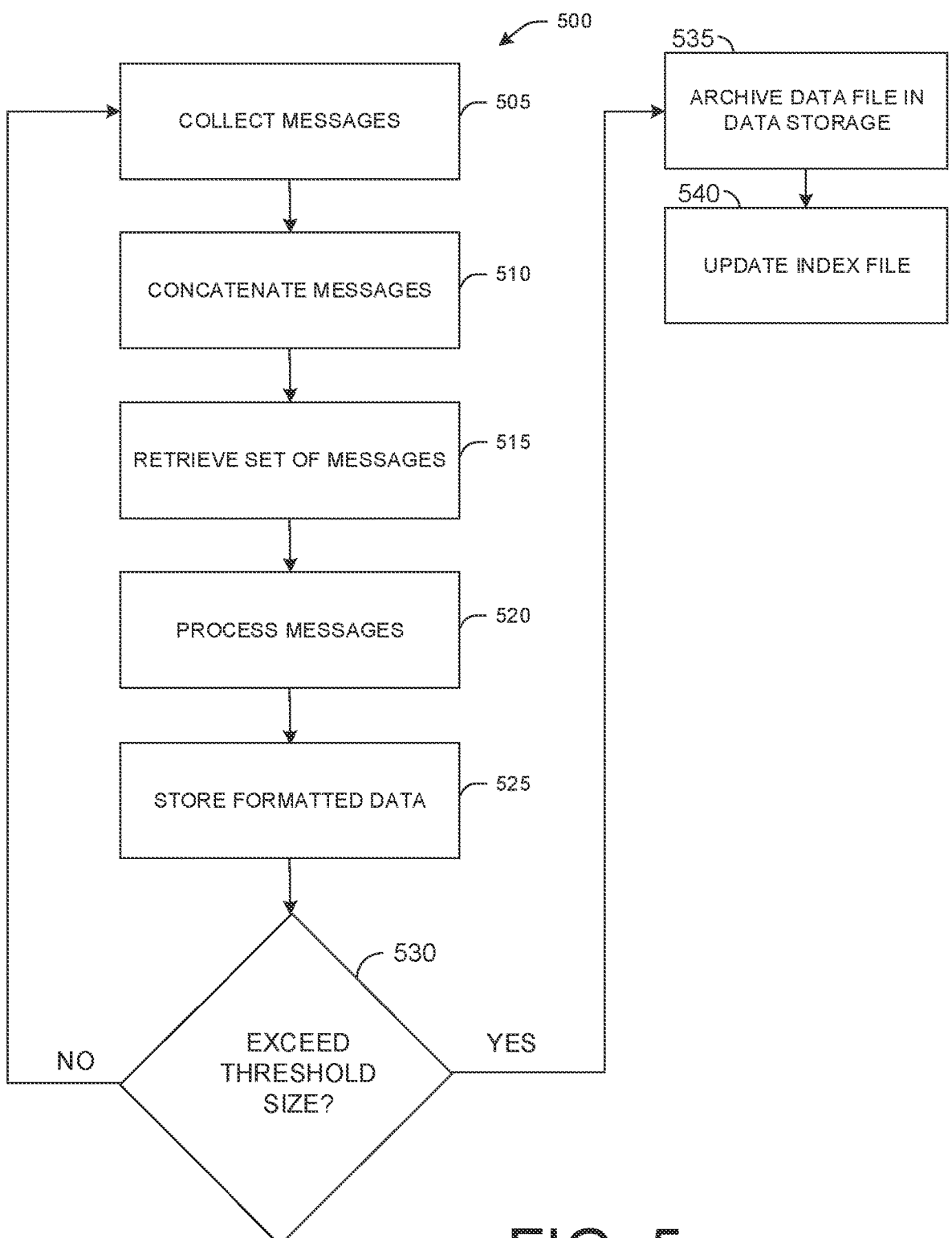
FIG. 5 illustrates a flowchart of an example method for managing a file based time series database.

In view of the foregoing structural and functional features described above, example methods will be better appreciated with reference to FIG. 5. While, for purposes of simplicity of explanation, the example methods of FIG. 5 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example methods of FIG. 5 can be implemented as instructions stored in a non-transitory machine-readable medium. The instructions can be accessed by a processing unit and executed to perform the methods disclosed herein.

FIG. 5 illustrates a flow chart of an example method 500 for managing data. The method 500 can be implemented, for example, by the system 100 of FIG. 2. At 505, a listener (e.g., the listener 132 of FIG. 2) collects messages from a message queue filled with messages generated by a plurality of generation sources. At 510, the listener concatenates messages associated with a given data source of the plurality of data sources to form a set of messages associated with the given data source. At 515, an indexer (e.g., the indexer 144 of FIG. 2) retrieves the set of messages associated with the given data source. At 520, the indexer processes the set of messages to provide processed data for the given data source. At 525, the indexer stores the processed data in a cache, wherein the processed data includes a data file with data from the given data source and an index file identifying a location of the data file.

At 530, the indexer makes a determination as to whether the formatted data for the given data source has reached a threshold size. If the determination at 530 is negative (e.g., NO), the method 500 returns to 505. If the determination at 530 is positive (e.g., YES), the method 500 proceeds to 535. At 535, the indexer archives the data file of the processed data in the data storage. At 540, the indexer updates the index file for the processed data to identify the data storage as the location of the data file.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine-readable medium having machine-executable instructions comprising an indexer that:
retrieves a set of messages generated by a given data source of a plurality of data sources from a data storage implemented as non-volatile memory;
processes the set of messages to generate processed data for the given data source and generate an index file identifying a location of a data file associated with the processed set of messages;
stores the processed data in a cache implemented as volatile memory, wherein the processed data includes the data file with data from the given data source;
updates the index file for the processed data to identify the cache as the location of the data file responsive to storing the process data in the cache;
determines when the processed data for the given generation source reaches a threshold size;
stores the data file of the processed data in the data storage implemented as the non-volatile memory responsive to determining that the processed data has reached the threshold size;
updates the index file for the processed data to identify the data storage as the location of the data file responsive to storing the data file in the data storage implemented as the non-volatile memory;
identifies exceptions within the processed data for the set of messages; and
performs an operation on the exceptions within the processed data in response to identifying the exceptions.

2. The non-transitory machine-readable medium of claim 1, wherein the set of message is time series data characterizing operations of an external system over a given time interval.

3. The non-transitory machine-readable medium of claim 2, wherein the processing by the indexer includes compressing the time series data to reduce a number of data values in the time series data by at least 50% in response to determining that the data values of the time series data remain constant over a sub-interval of time of the given interval of time.

4. The non-transitory machine-readable medium of claim 1, further comprising:
an application programming interface (API) that:
receives a request for data generated by the given generation source;
identifies a present location of a data file containing the requested data; and
retrieves the requested data from the present location in response to the identifying.

5. The non-transitory machine-readable medium of claim 4, wherein the API receives the request for the processed data prior to the determining by the indexer.

6. The non-transitory machine-readable medium of claim 4, wherein the API receives the request for the processed data after the determining by the indexer.

7. The non-transitory machine-readable medium of claim 4, wherein the API queries an index file of the processed data stored in the cache for a location of the data file in response to the request for data generated by the given generation source.

8. The non-transitory machine-readable medium of claim 1, wherein the indexer retrieves data periodically from the data storage.

9. The non-transitory machine-readable medium of claim 1, wherein a subset of the plurality of data sources are in communication with sensors for a wind turbine.

10. The non-transitory machine-readable medium of claim 1, further comprising a listener that collects messages from a message queue filled with messages from the plurality of data sources and concatenates messages generated by the given data source to provide the set of messages.

11. The non-transitory machine-readable medium of claim 10, wherein the set of messages is raw data stored in a block of data having a predetermined size.

12. A system for managing data, the system comprising:
a listener operating on one or more computing platforms that:
collects messages from a message queue filled with messages generated by a plurality of data sources; and
concatenates messages from a given data source of the plurality of data sources to form a set of messages and stores the set of messages in a data storage implemented as non-volatile memory;
an indexer operating on the one or more computing platforms that:
retrieves the set of messages from the data storage;
processes the set of messages to generate processed data and generates an index file identifying a location of a data file associated with the processed set of messages;
stores the processed data in a cache implemented as volatile memory, wherein the processed data includes the data file with data from a given data source;
updates the index file for the processed data to identify the cache as the location of the data file responsive to storing the process data in the cache;
determines when the data file of the processed data for the given generation source reaches a threshold size;
stores the data file in the data storage implemented as the non-volatile memory in response to the determining that the processed data has reached the threshold size; and
updates the index file for the processed data to identify the data storage as the location of the data file responsive to storing the data file in the data storage implemented as the non-volatile memory;
identifies exceptions within the processed data for the set of messages; and
performs an operation on the exceptions within the processed data in response to identifying the exceptions; and
an application programming interface (API) operating on the one or more computing platforms that interfaces with external computing platforms to handle requests for data generated by the plurality of generation sources.

13. The system of claim 12, wherein the set of messages stores time series data characterizing operations of an external system over a given interval of time.

14. The system of claim 13, wherein the indexer compresses the time series data stored in the set of messages to reduce a number of data values in the time series data by at least 50% in response to determining that the data values of the time series data remain constant over a sub-interval of time of the given interval of time.

15. The system of claim 12, wherein the API further:
receives a request for data generated by the given generation source;
identifies a present location of a data file containing the requested data; and
retrieves the requested data from the present location in response to the identifying.

16. The system of claim 15, wherein the API receives the request for the data prior the determining by the indexer.

17. The system of claim 15, wherein the API receives the request for the data after the determining by the indexer.

18. The system of claim 12, wherein the set of messages is raw data stored in a block of data having a predetermined size.

19. A method for managing data, the method comprising:
collecting, by a listener operating on one or more computing devices, messages from a message queue filled with messages generated by a plurality of data sources;
concatenating, by the listener, messages associated with a given data source of the plurality of data sources to form a set of messages associated with the given data source;
retrieving, by an indexer operating on the one or more computing devices, the set of messages associated with the given data source from a data storage implemented as non-volatile memory;
processing the set of messages to provide processed data for the given data source;
generating an index file identifying a location of a data file associated with the processed set of messages;
storing, by the indexer, the processed data in a cache implemented as volatile memory, wherein the processed data includes the data file with data from the given data source;
updates the index file for the processed data to identify the cache as the location of the data file responsive to storing the process data in the cache;
determining, by the indexer, when the processed data for the given generation source reaches a threshold size;
archiving the data file of the processed data in the data storage implemented as the non-volatile memory responsive to determining that the processed data has reached the threshold size; and
updating the index file for the processed data to identify the data storage as the location of the data file responsive to archiving the data file in the data storage implemented as the non-volatile memory.

20. The method of claim 19, the method further comprising:
receiving, by an application programming interface (API), a request for the processed data;
identifying, by the API, a present location of the processed data for the given generation source;
retrieving, by the API, the processed data in response to the identifying; and
providing, by the API a response to the request for the processed data.

\* \* \* \* \*